L. BEAUCHE.
MACHINE FOR MAKING CIGARS.
No. 19,341. Patented Feb. 16, 1858.
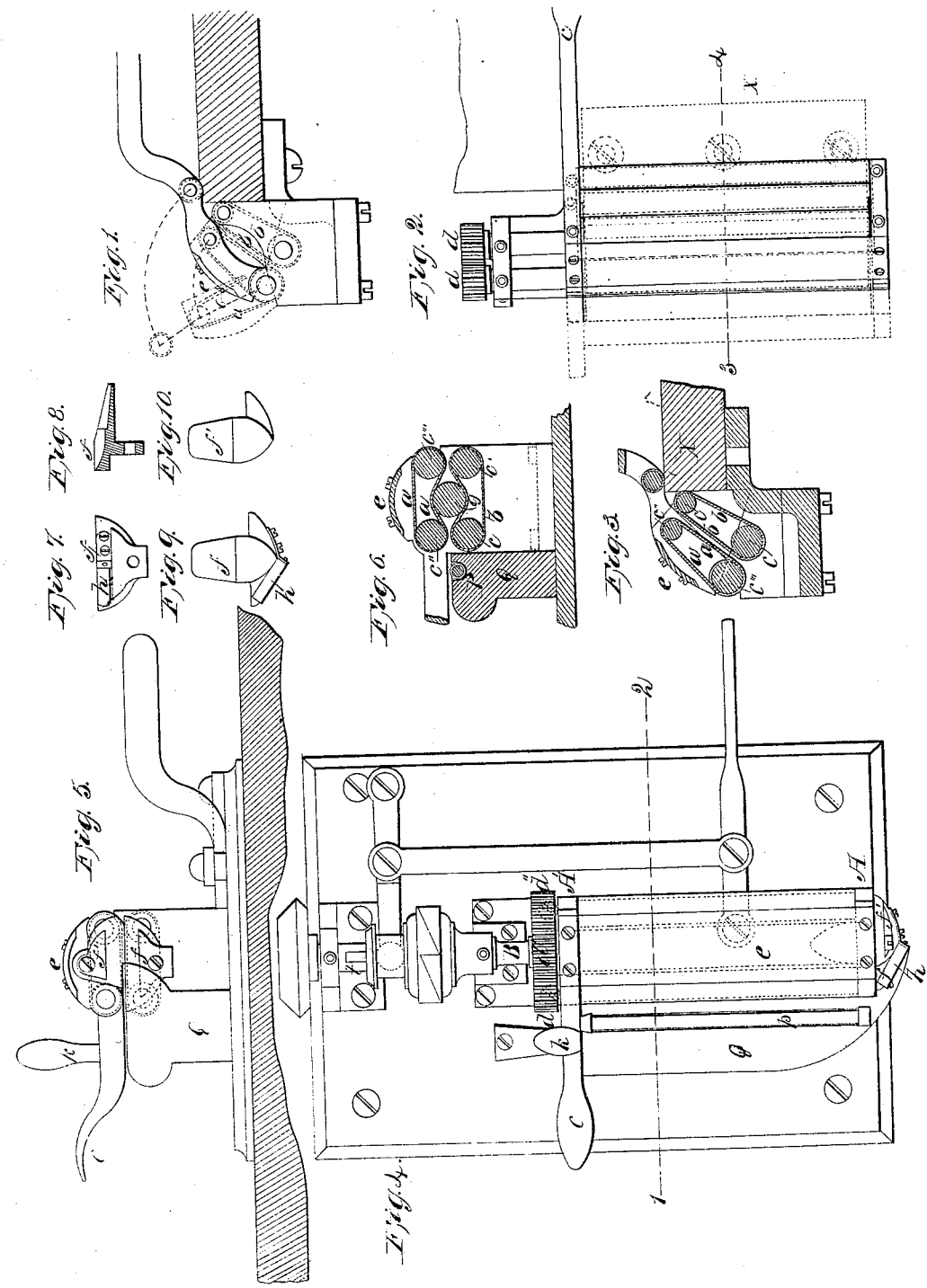

UNITED STATES PATENT OFFICE.

LOUIS BEAUCHÉ, OF PARIS, FRANCE.

MACHINE FOR MAKING CIGARS.

Specification forming part of Letters Patent No. 19,341, dated February 16, 1858.

*To all whom it may concern:*

Be it known that I, LOUIS BEAUCHÉ, of Paris, in the French Empire, have invented a new and useful Machine for Making Cigars; and I do hereby declare that the following is a full, clear, and exact description thereof, reference being had to the accompanying drawings, making part of this specification.

My invention consists in certain mechanical devices by the aid of which cigars may be manufactured by machinery.

The manufacture of cigars consists in two principal operations: first, that of making the core of the cigar; second, that of covering this core with tobacco-leaves, so as to give it the appearance of finish which is so highly valued in such kinds of articles. The mechanical means for effecting these operations consist, therefore, in peculiar devices for gathering the tobacco-leaves, giving to them the proper shape, and, finally, surrounding the core with a covering leaf or leaves, which extend from one extremity to the other, where they are so twisted as to form a closed end.

The annexed drawings show the arrangement of machines used for the manufacture of cigars, Figure 1 being a plan view, Fig. 2 an elevation, and Fig. 3 a transverse section through the line 3 4 in Fig. 2. These figures show the machine when closed—that is, ready to operate—while the parts shown in red lines represent the machine when open—*i. e.*, when about receiving the tobacco-leaves for forming the core of cigars. Fig. 4 is a plan view, Fig. 5 an end view of the machine for covering the core, and Fig. 6 a section through the line 1 2 in Fig. 4.

The principle which is common to both machines consists in the continuity of movement of two surfaces on endless bands $a$ and $b$, stretched upon rollers $c$ $c'$ $c''$ $c'''$, to which a rotary motion is imparted by means of suitable gears, $d$ $d'$ $d''$. These rollers, which may have equal or unequal diameters, are placed at their extremity in journals supported by a frame, A A'. The latter—*i. e.*, A'—has the gearing apparatus $d$ $d'$ $d''$, which puts the roller $c$ $c'$ in motion, and consequently the rubber bands. One of the gear-wheels occupies a central position in relation to the machine, and is mounted upon a shaft which is provided at its extremity with a coupling-cam or clutch to allow the machine to be thrown out of gear with the main shaft $t$, that derives its motion from any mechanical power by means of pulleys or cog-wheels. The frames supporting the rollers are made in two parts, and are hinged together, one of the rollers forming the hinge-axle. The upper frame is rigidly connected with a lever, C, which serves the purpose of bringing the two surfaces or bands together. This operates in connection with a spring-bar, the upper end of which forms a curvilinear cam-shaped handle, so that when the lever C is let down the spring-bar will gradually yield until the lever shall have passed the projection or handle, when the spring-bar will be relieved, fall in, and hold the lever in its position permanently during the operation.

In the lower portion of the frame A, and toward its extremity opposite to that where the handle is, a concave piece, $f$, made of brass or steel, is inserted. This piece, detail views of which are shown in Figs. 7, 8, and 9, advances from below the rubber band, and is intended as a bed and guide for said band when pressed by the cigar. At the point of this conical cavity is a small roller free to revolve on its axis, which facilitates the feed of the tobacco-leaf, and gives a certain twist at the point of the cigar to insure it from unwinding. The metallic plate $e$ is to cover the rubber band and to preserve it from dust, &c. The upper frame with the band $a$ has a steel or brass cavity, $f'$, corresponding to that of the lower cavity, $f$. A detail plan view of this cavity is shown in Fig. 10. These two cavities together will give a perfect shape to the mouth-piece of the cigar.

The operation of the above-described machine is as follows: The apparatus for forming the cores is secured to the table X in the manner shown in the drawings, Figs. 1, 2, and 3. Each extremity of the frame is furnished with knives, which, by approaching the framer, will cut the leaves to the proper length of the core. The two surfaces, made of india-rubber, gutta-percha, leather, or any other suitable material, are then put in motion, which, revolving in contrary directions, have a tendency to concentrate into a core the tobacco-leaves which are placed between said surfaces. When this preliminary work is done, the core is surrounded by the covering-leaves. For that purpose it is brought to the machine shown in Figs. 4, 5, and 6, which is so arranged as to allow the leaf to be guided from one extremity of the core to the other, and to give it the suitable shape throughout its whole length. These two machines are essentially the same. They only differ in certain details for shaping the cigar. The finishing of the cigar is done in the following manner: The core is placed on the band $b$, a covering-leaf being previously engaged under it, after having been cut, so as to clear the gearing apparatus at $A'$. The machine is then thrown into gear by approaching the coupling-rack. The bands move in opposite directions, whereby the leaves are drawn to and wound around the core as tightly as the pressure due to the elasticity of the material of which the bands are made allows of. The leaves are thus fed in by the machine itself, and require only to be directed so as to regulate the thicknesses of the covering-leaves.

The devices described as being in separate machines may be embodied in one and the same machine—i. e., the knives and shapers may be made separate and removable, so as to be adjusted onto the frame carrying the rollers; but for practical purposes, and particularly when these machines are to operate in large establishments, it is obvious that they will perform the work with greater convenience when separated and placed in separate machines.

Having now fully described my invention, what I claim, and desire to secure by Letters Patent, is—

1. Forming the core of cigars and covering the same with tobacco-leaves, so as to acquire a perfect shape, by means of the apparatus herein described, consisting, mainly, of endless bands, made of india-rubber or any other suitable yielding substance, revolving in contrary directions, so as to gather the tobacco for forming the core under required pressure.

2. At or near the ends of the covering-bands, shaping-dies which are so constructed as to allow the leaves to be fed in and between them to give a perfect form to the conical end of the cigar.

3. The arrangement herein described of knives on each of the frames supporting the band-rollers.

4. The general arrangement of parts constituting a cigar-making machine, substantially as specified.

In testimony whereof I have signed my name to this specification before two subscribing witnesses.

LOUIS BEAUCHÉ.

Witnesses:
  GEO. HUTTON,
  EMILE BARRAULT,
    33 *Bard St. Martin*.